United States Patent
Seiger et al.

[15] 3,642,600
[45] Feb. 15, 1972

[54] GAS DETECTION ANNUNCIATOR APPARATUS

[72] Inventors: Harvey N. Seiger, East Brunswick; Robert J. Dagnall, Bound Brook, both of N.J.

[73] Assignee: Gulton Industries, Inc., Metuchen, N.Y.

[22] Filed: Apr. 3, 1969

[21] Appl. No.: 842,745

Related U.S. Application Data

[62] Division of Ser. No. 585,805, Oct. 11, 1966, Pat. No. 3,451,901.

[52] U.S. Cl. .................................................... 204/195
[51] Int. Cl. .................................................... G01n 27/28
[58] Field of Search........... 204/195 R, 195 G, 195 H, 195 M, 204/195 L, 195 W, 195 S, 195 P, 195 F, 195 T, 195 C, 195 B, 1 T; 23/232 E, 254 E, 255 E; 324/29, 30; 195/103.5

[56] References Cited

UNITED STATES PATENTS 2,859,164  11/1958  Michelson et al. .................. 204/195
3,403,081  9/1968  Rohrback et al. .................. 204/195 X Primary Examiner—G. L. Kaplan
Attorney—Wallenstein, Spangenberg, Hattis & Strampel

[57] ABSTRACT

An apparatus for the detection of nerve gases comprising reservoirs for enzyme and substrate, electrochemical cell means, air-conveying means and sensing and annunciator means.

13 Claims, 7 Drawing Figures

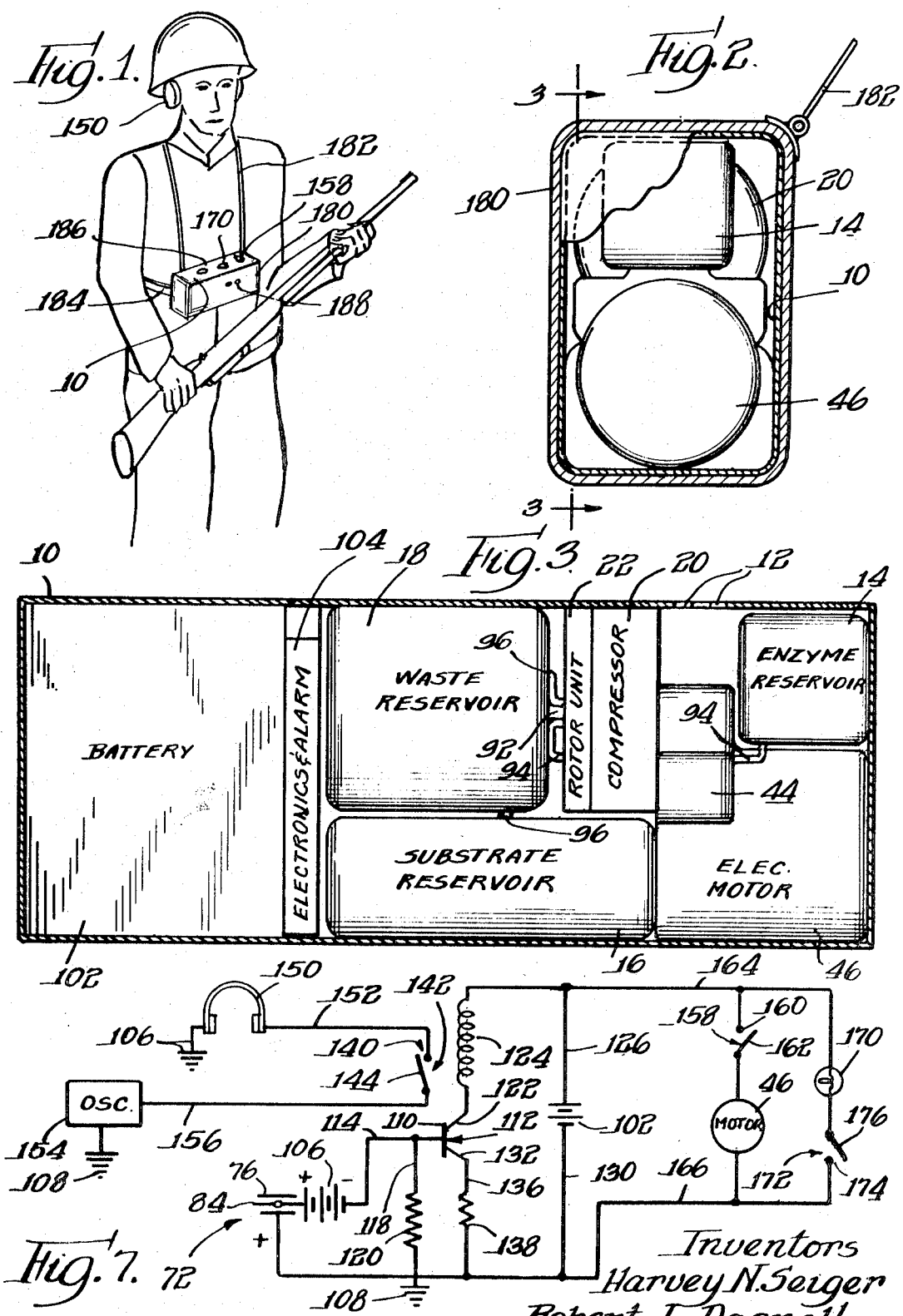

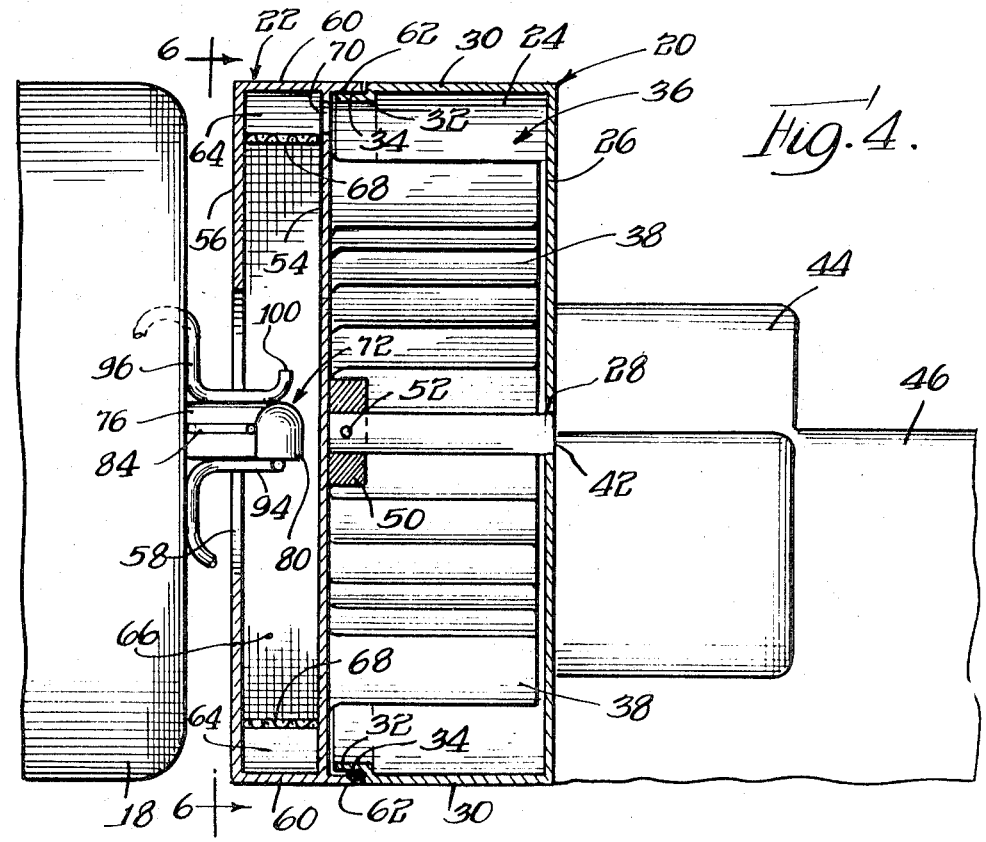
Fig. 4.
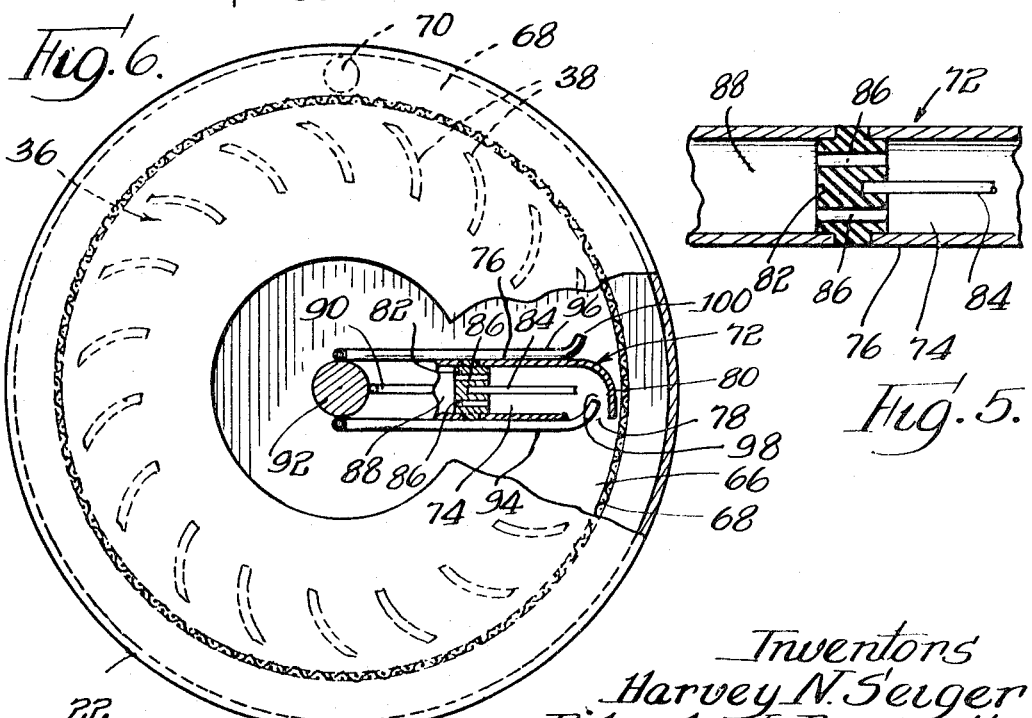
Fig. 6.
Fig. 5.
Inventors
Harvey N. Seiger
Robert J. Dagnall

GAS DETECTION ANNUNCIATOR APPARATUS

This application is a division of application Ser. No. 585,805, filed Oct. 11, 1966, now U.S. Pat. No. 3,451,901.

The present invention relates to apparatus for, and a method of, detecting gases which attack the nervous system of the human body when they are inhaled or brought into direct contact with the skin.

The potentialities of the so-called nerve gases as chemical warfare agents has long been recognized, although, so far as is known, they have never been used tactically in a military campaign. Their effectiveness as a tactical military weapon resides in their capability for quickly immobilizing military personnel and from the fact that they are not readily or easily detectable by the senses.

Based on information presently available, no progress of any significant import has been made in the development of automatic, self-contained, portable equipment for the detection of nerve gases in the field. So far as can be ascertained, the closest approach to an automatic unit having utility for this purpose is a cabinet-encased detector, mounted on wheels, which weighs approximately 725 pounds and requires a source of 110-volt alternating current for operation. Apart from this unit, the only other known means for enabling military personnel in the field to detect nerve gases are kits which are carried on the person. These kits contain chemicals which undergo a change in color in the presence of chemical warfare gases. However, before a nerve gas can be detected with such a kit, an individual in the field must first eliminate the possibility that gases other than nerve gases are present. This determination is made through a successive series of exposure tests performed with the chemicals in the kit. If a negative result is obtained in all but the last test, the man in the field will know that a nerve gas is present. The disadvantages of such kits, as well as of the aforementioned automatic unit, for field use in the detection of nerve gases, are manifest.

In accordance with one aspect of the present invention there is provided compact, fully automatic, self-contained, portable annunciator apparatus for enabling nerve gases to be quickly and unerringly detected in the field under even the most adverse conditions. The apparatus of this invention can be carried by an individual without hampering his movements and will continue to function in any position assumed by the person carrying it. The apparatus is capable of giving either a visual or audible, or both, signal which will not reveal the position of the wearer to an adversary. It can operate continuously for periods of 24 hours or longer. While being light in weight, it can withstand the rigors of field use. In addition, it has a minimum of moving parts and can readily be turned on or off by the wearer when desired.

Briefly, the preferred embodiment of the apparatus of the present invention comprises a main housing, vented to atmosphere, which may be encased in a pouch or other suitable carrying case. The housing is provided with containers or reservoirs for separately holding supplies of electrochemically reactive substances comprising an enzyme, or an enzymelike agent, and a substrate which most advantageously are caused to flow continuously in small quantities into an electrode-containing space to form an electrochemical cell. The enzyme and substrate are characterized in that they engage in an electrochemical reaction which is adversely affected by nerve gases, so that the electrochemical cell has one electrical condition in the absence of nerve gases and a different electrical condition in the presence of nerve gases. Of the known nerve gases, substantially all are organophosphorus-type compounds which irreversibly inhibit or poison enzymes and enzymelike agents. This effect is produced with extremely small concentrations of nerve gases and is sufficient in magnitude to upset the electroactivity of the enzyme and substrate to cause an immediately detectable change of the electrical condition in the electrochemical cell. Means are provided in the housing for bringing air from the atmosphere into contact preferably with at least one of the electrochemical substances as it is directed to the electrochemical cell. Light and/or sound generating annunciator means are provided for the apparatus which respond to the output of the electrochemical cell for indicating the presence of nerve gases. The apparatus carries its own power source which is preferably a dry-cell battery and can be activated and deactivated by the user as desired. The enzyme and substrate reservoirs are of sufficient capacity to enable the apparatus to operate continuously for approximately 24 hours. The carrying case for the apparatus may be provided with straps whereby it may be supported on the chest, back, or along the side of an individual. Alternatively, the carrying case may be provided with fastening means enabling the apparatus to be carried on a pistol belt, for example.

Other aspects of the invention involve the compact, light-in-weight construction and arrangement of the components which effect the conveying and mixing of the enzyme, substrate and air in an efficient and effective manner.

The above and other features and advantages of this invention will become apparent upon making reference to the specification to follow, the claims, and the drawings wherein:

FIG. 1 is a fragmentary view in perspective showing an embodiment of the present invention supported on the chest of an individual by means of straps;

FIG. 2 is a broken away end view of an embodiment of the apparatus of the present invention;

FIG. 3 is a somewhat diagrammatic vertical sectional view of the embodiment taken substantially along line 3—3 of FIG. 2;

FIG. 4 is an enlarged fragmentary view, partly in section, showing among other things, the mixing chamber of said embodiment of the invention and the associated electrochemical cell means;

FIG. 5 is an enlarged fragmentary view, partly in section, of the electrochemical cell means of said embodiment;

FIG. 6 is a view, partly in section, taken substantially along line 6—6 of FIG. 4; and FIG. 7 is an exemplary circuit diagram for said embodiment of the invention.

Referring now in greater detail to the drawings, particularly FIGS. 2 through 6 thereof, the preferred embodiment of the apparatus of the present invention there shown comprises a housing 10, desirably fabricated of metal or high-impact strength plastic, having ports or vents 12 therethrough to enable air to pass into the housing and out of it. Internally of the housing 10 there is provided a reservoir 14 for an enzyme or enzymelike agent, a substrate reservoir 16 and a waste reservoir 18. The quantity of enzyme necessary to react with the substrate is small. Therefore, the capacity of the enzyme reservoir 14 may be less than that of the substrate reservoir 16. For example, in one embodiment of the invention, the capacities of the reservoirs 14 and 16 may be approximately 20 and 50 cubic centimeters, respectively. The waste reservoir 18 has a capacity sufficient to hold the combined volumes of enzyme and substrate carried in the reservoirs 14 and 16.

The enzyme and the substrate advantageously are maintained under pressure in their respective reservoirs to assure a continuous flow thereof through the apparatus when it is in operation. Pressurization of the enzyme and substrate can be attained, for example, with compressed gases such as carbon dioxide or propane, or with halogenated hydrocarbons exemplified by the freons, for instance, Freon 11 or Freon 12. In order to avoid possible adverse affects on the enzyme and substrate due to direct contact thereof with the pressurizing agent, it is desirable to employ within each of the reservoirs 14 and 16 a flexible, substantially gas and liquid impervious membrane or diaphragm (not shown) to separate the enzyme and substrate from the pressurizing agent. The pressure maintained in the reservoirs 14 and 16 desirably may be in the range of 50 to 120 p.s.i.

Also provided in the housing 10, as best shown in FIG. 4 of the drawing, are a stationary enclosure unit 20 and a cylindrically shaped, movable rotor unit 22. The illustrated enclosure unit 20 is substantially cylindrical in shape and has a chamber 24 defined in part by an axially facing end wall 26 provided with a central opening 28 therethrough and a cylindrical sidewall 30, one end 32 of which is stepped inwardly to form a bearing surface 34 the function of which will become clear as the description proceeds. Positioned within the chamber 24 of the enclosure unit 20 is an air compressor 36 having a plurality of air vanes 38 mounted on a shaft 42. One end of the shaft 42 of the compressor 36 extends through the opening 28 in the end wall 26 of the enclosure unit 20 and is journaled in a gearbox 44 containing gears (not shown) driven by a motor 46. The opposite end of the shaft 42 is rigidly secured by a fixed locknut 50, having a setscrew 52, to an axially facing, inner end wall 54 of the rotor unit 22. The end wall 54 is common to the enclosure unit 20 and the rotor unit 22 and serves, in conjunction with the end wall 26, and the cylindrical sidewall 30, to define the chamber 24 of the enclosure unit 20.

The rotor unit 22, in addition to the inner end wall 54, is formed by an outer axially facing end wall 56 provided with a substantially centrally positioned opening 58 therethrough, and a cylindrical sidewall 60 having an outwardly extending portion 62 which closely overlies the bearing surface 34 formed by the stepped end 32 of the sidewall 30 of the enclosure unit 20. The rotor unit 22 is formed into two sections, namely, an outer annular air-receiving compartment 64 and an inner, fluid-mixing compartment 66, by an annular membrane or partition 68 which is pervious to the passage of air therethrough but is impervious to the passage of liquid therethrough. The compartment 64 of the rotor unit 22 communicates with the chamber 24 of the enclosure unit 20 through a peripheral opening 70 in the end wall 54 of the rotor unit. The compartment 66 is vented to atmosphere through the opening 58 in the end wall 56.

Extending into the fluid-mixing compartment 66 of the rotor unit 22, through the centrally positioned opening 58 in the end wall 56 thereof, is an electrochemical cell 72. The cell 72 comprises an enzyme-substrate mixing chamber 74 formed by a metal pickup tube 76, the inlet 78 of which is positioned adjacent the partition 68. The pickup tube 76 forms the cathode of the electrochemical cell 72 and a curved wall portion 80 of the tube serves as a deflector for directing the electrochemically reactive enzyme-substrate mixture into the chamber 74. Positioned within the pickup tube 76 is an insulator 82 which carries the anode 84 of the electrochemical cell 72. The insulator 82 has passageways 86—86 therethrough to enable the enzyme-substrate mixture to pass out of the cell 72. The passageways 86—86 communicate at their outlet ends with a collecting chamber 88 which is connected to the waste reservoir 18 through a conduit 90 and a main drain line 92.

The enzyme reservoir 14 is joined to a conduit 94 and the substrate reservoir 16 is joined to a conduit 96 for carrying the enzyme and substrate, respectively, contained therein to the fluid-mixing compartment 66 of the rotor unit 22. As best seen in FIGS. 4 and 5, the outlet end 98 of the conduit 94 terminates inwardly of the inlet 78 of the pickup tube 76, while the outlet end 100 of the conduit 96 terminates adjacent the partition 68 on the outside of the pickup tube 76. The purpose of this arrangement will become clear as the description proceeds.

As indicted hereinabove, the motor 46 is operatively connected to the gears in the gearbox 44, and the gears, in turn, drive the shaft 42 connected to compressor 36 and the end wall 34 of the rotor unit 22. The power source for the motor 46 is a battery 102. The motor 46 and the battery 102 desirably are of sufficient size to rotate the compressor 36 and the rotor unit 22 at a relatively high speed such as, for example, about 200 revolutions per minute. In the preferred embodiment of the invention illustrated, speeds of this magnitude can be developed with a 0.005-horsepower motor powered by a 20 ampere-hour dry-cell battery. The compressor 36, when operated at this speed, can readily develop adequate pressures in the chamber 24 of the enclosure unit 20. Adequate pressures for the purpose of the present invention may range from one-fourth to one-half pound per square inch above atmospheric pressure.

The battery 102 further serves as a power source for the operation of an alarm system 104 for the apparatus. In FIG. 7 of the drawings, there is shown an exemplary circuit diagram for such a system. While the circuit illustrated is designed for detecting changes in voltage in the electrochemical cell 72 it should be understood that circuits can be devised for detecting changes in current densities induced by changes in the cell. As illustrated, the anode 84 of the electrochemical cell 72 is connected to the positive terminal of a biasing battery 106. The cathode of pickup tube 76 of the cell 72 is connected to ground 108. The positive terminal of the biasing battery 106 is connected to the base electrode 110 of an NPN-transistor 112 by a conductor 114. The conductor 114 is connected to ground 108 through conductor 118 and resistor 120. The collector electrode 122 of the transistor 112 is connected to a relay 124 which, in turn, is connected by a conductor 126 to the positive terminal of the battery 102. The negative terminal of the battery 102 is connected to ground 108 through conductor 130. The emitter electrode 132 of the transistor 112 is connected to ground 108 through conductor 136 and resistor 138. Associated with the relay 124 is a normally open switch 140 having a stationary contact 142 and a movable contact 144. The contact 142 is connected to a pair of earphones 150, for example, through a conductor 152, while the contact 144 is connected to an oscillator 154 through a conductor 156. The operation of the alarm system is controlled by an "on-off" switch 158 having a stationary contact 160 and a movable contact 162. The contact 160 is connected to the conductor 126 by a conductor 164. The contact 162 is connected to one terminal of the motor 46. The other terminal of the motor 46 is connected to ground by a conductor 166. A lamp 170 desirably is provided for the alarm system 104 to elicit a visual warning signal. The lamp 170 is associated with a switch 172 having a stationary contact 174 and a movable contact 176 connected to the circuit of the relay 124 through suitable conductors.

In utilizing the apparatus of the present invention, the enzyme reservoir 14 and the substrate reservoir 16 first are filled with a suitable enzyme and substrate. In this connection, the reservoirs 14 and 16 may be in the form of prefilled cartridges which can be inserted into and removed from the apparatus in the field as desired. The operation of the apparatus of this invention in essence is based on the high specificity of enzyme action and on the finding that certain enzymes undergo denaturation and inactivation, or "poisoning," in the presence of extremely small concentrations of nerve gases. With respect to the phenomenon of enzyme specificity, many enzymes react with only one substrate. Others will react with only a small number of closely related substrates, carrying out the same reaction in all cases. The reaction between the enzyme and substrate is electrochemical in nature and can produce measurable electrical phenomenon. In the present apparatus, the reaction between the enzyme and substrate produces a given substantially constant voltage in the electrochemical cell 72 in the absence of nerve gases. The substantially constant electrical condition thus established can be disrupted by nerve gases to cause a drop in voltage whereby the alarm system of the apparatus is energized. Enzymelike substances such as coenzymes and apoenzymes also are specific in their reactions and can be utilized to establish a substantially constant electrical condition. It should be understood, therefore, that the term "enzyme" as used in the present description and the claims is intended to include, and to encompass, such substances.

The enzyme-substrate system employed in connection with the apparatus of this invention can be selected from a wide group. Exemplary of one such system is choline esterase, or its ester, acetylcholinesterase, as the enzyme, and choline ester, or a derivative of choline ester, such as thiocholine or acetythiocholine, as the substrate. The electroactivity of these substances is adequate to establish the electrical conditions desired in the apparatus and all known nerve gases are irreversible inhibitors of the named enzymes at very low concentrations.

The apparatus of the present invention can be activated by a simple "on-off" switch 158 which connects the motor 46 in circuit with the battery 102. Valves, (not shown) which may be either manually or electrically operated, are provided in the enzyme conduit 94 and the substrate conduit 96 for controlling flow of fluid therethrough. Energization of the motor 46 rotates the gears in the gearbox 44 which rotate the shaft 42. As the shaft 42 rotates, the vanes 38 of the compressor and the rotor unit 22 rotate with it. Atmospheric air is sucked into the chamber 24 of the enclosure unit 20 and exits, under pressure, through the peripheral opening 70 and passes into the annular compartment 64 of the rotor unit 22. As the rotor unit 22 rotates, substrate passing from the outlet 100 of the substrate conduit 96 is brought into contact with the partition 68 by centrifugal force. The partition 68, as indicated hereinabove, is pervious to the passage of gases therethrough but impervious to the passage of liquids therethrough. Therefore, the compressed air in the annular chamber 64 passes through the partition 68 and a portion thereof is admixed with the substrate in contact with the partition. A portion of the substrate-air mixture is deflected into the chamber 74 of the cell 72 where it is admixed with a small quantity of enzyme from the conduit 94. The mixture then passes through the chamber 74 where the enzyme and substrate react to generate a voltage as described. The spent enzyme and substrate pass through the passageways 86—86 in the insulator 82 and are channeled into the waste reservoir 18 through the conduit 90 and the drain line 92. The greater portion of the compressed air passing through the partition 68 is expelled from the mixing compartment 66 of the rotor unit 22 through the opening 58 in the end wall 56 thereof.

In the absence of a nerve gas, the electrical condition resulting from the reaction of the enzyme and substrate in the cell 72 will produce a given positive voltage on the anode 84 relative to the cathode or pickup tube 76. The voltage of the biasing battery 106 is in opposition to the output of the electrochemical cell 72. The magnitude of the voltage of the biasing battery is normally less than the voltage of the electrochemical cell 72 so that there is a net positive voltage applied to the base electrode 110 of the transistor 112 relative to ground 108. In a NPN-transistor, such a voltage will normally produce a relatively high current flow therethrough and the relay 124 is selected to be energized by this current flow. The contacts 142–144 of the relay 124 are open when the relay 124 is energized, disconnecting the oscillator 154 from the earphones 150. In the presence of nerve gas, the electrochemical reaction in the cell 72 will be inhibited or reduced in activity, resulting in a reduction of the voltage produced in the cell 72 to a point where the voltage of the biasing battery 106 overcomes the voltage of the electrochemical cell 72, thereby producing a negative voltage relative to ground on the base electrode 110 of the transistor 112. This will reduce or cut off the flow of current in the transistor 112, which deenergizes the relay 124, causing the contacts 142–144 thereof to close to connect the oscillator 154 to the earphones 150.

Where a visual indication is desired, the relay 124 may be supplied with a second set of normally open contacts 174–176 which connect a lamp 170 to the battery 102. Accordingly, when nerve gases are detected, contacts 174–176 will close to energize the lamp 170. The lamp 170 may be mounted at the top of the housing 10 where it is readily visible to the person carrying the same.

Manifestly the present invention contemplates other circuitry than the exemplary alarm circuit described above.

As indicated at the outset, the reservoirs 14 and 16, when filled to capacity, will enable the apparatus to operate in the field for up to 24 hours. The utilization of a rotating unit such as the rotor unit 22 enables the apparatus to operate in any attitude. In FIG. 1 of the drawing, the apparatus is shown being carried in a pouch 180 on the chest of a soldier by means of shoulder straps 182 and waist straps 184. The arrangement shown may employ a visual as well as an audible alarm signal. A control panel 186 is conveniently located on the top wall of the housing 10 to enable the user to switch the apparatus on or off, as desired, and to see the visual signal given by the lamp 170. The front panel of the pouch 180 desirably has openings 188 therethrough to enable atmospheric air to be more readily sucked into ports or vents 12 in the housing 10.

While for purposes of illustration a preferred form of the present invention has been disclosed, other forms thereof may become apparent to those skilled in the art upon reference to this disclosure and, therefore, this invention should be limited only by the scope of the appended claims.

What is claimed is:

1. A self-contained, portable annunciator apparatus for detecting nerve gases comprising a housing, reservoirs in said housing for separately holding supplies of electrochemically reactive substances, electrochemical cell means in said housing for forming an electrochemical cell with said substances, said substances when combined in said cell means being capable of manifesting one electrical condition in the absence of a nerve gas and a different electrical condition in the presence of a nerve gas, means associated with said reservoirs for continuously withdrawing the electrochemically reactive substances therefrom and directing them to said electrochemical cell means, air conveying means for bringing air from the atmosphere into contact with said electrochemically active substances, said air conveying means including a stationary air-pressurizing unit and a movable air-electrochemical mixing unit, and sensing means and annunciator means for detecting a change in said electrochemical cell from said one electrical condition of said substances in the absence of a nerve gas to said different electrical condition of said substances in the presence of a nerve gas, and for giving an alarm when such a change is detected.

2. Apparatus as claimed in claim 1 wherein the movable air-electrochemical substance mixing unit is in communication with the stationary air-pressurizing unit, and comprises a pressurized air-receiving compartment and an air-electrochemical substance mixing compartment.

3. Apparatus as claimed in claim 2 wherein the pressurized air-receiving compartment and air-electrochemical substance mixing compartment are formed by a partition which is pervious to the passage of air therethrough and impervious to the passage of liquid therethrough.

4. Apparatus as claimed in claim 2 wherein the air-electrochemical substance mixing compartment is provided with an opening for receiving electrochemical cell forming means.

5. Apparatus as claimed in claim 1 wherein an inlet and an outlet are provided for the electrochemical cell means for continuously admitting the electrochemically reactive substances thereinto and for continuously draining the combined substances therefrom.

6. Apparatus as claimed in claim 5 wherein a waste reservoir is provided in the housing, said reservoir being in communication with the outlet of the electrochemical cell means for collecting the combined substances draining therefrom.

7. Apparatus as claimed in claim 1 wherein at least one of the reservoirs in said housing contains an enzyme which is susceptible to inactivation in the presence of nerve gases, and another of the reservoirs contains a substrate which, in the absence of nerve gases, undergoes an electrochemical reaction with the enzyme.

8. Apparatus as claimed in claim 7 wherein the enzyme is a choline esterase or a derivative thereof and the substrate is choline or a derivative thereof which is activatable by said enzyme.

9. Apparatus as claimed in claim 1 wherein the electrochemical cell means comprises a metallic pickup tube having an electrochemical substance mixing chamber therein.

10. Apparatus as claimed in claim 1 wherein the stationary air-pressurizing unit comprises a chamber having a compressor rotatably mounted therein.

11. Apparatus as claimed in claim 1 wherein the reservoirs for the electrochemically reactive substances are pressurized to facilitate withdrawal of the substances therefrom.

12. Apparatus as claimed in claim 1 wherein the sensing means and annunciator means includes means for displaying a visible signal to the person carrying the same when said change of electrical condition of the electrochemical cell means is detected.

13. Apparatus as claimed in claim 1 wherein the sensing means and annunciator means includes means for producing a signal which is audible to the person carrying the same when said change of electrical condition of the electrochemical cell means is detected.

* * * * *